United States Patent
Dufour et al.

(10) Patent No.: US 7,283,826 B2
(45) Date of Patent: Oct. 16, 2007

(54) CONTACTLESS MAGNETIC SENSOR FOR DETERMINATION OF THE LINEAR POSITION OF A MOVING BODY

(75) Inventors: Laurent Dufour, Meximieux (FR); Olivier Andrieu, Beynost (FR)

(73) Assignee: Electricfil Automotive, Miribel Cedex (FR)

( * ) Notice: Subject to any disclaimer, the term of this patent is extended or adjusted under 35 U.S.C. 154(b) by 126 days.

(21) Appl. No.: 10/552,703

(22) PCT Filed: Apr. 7, 2004

(86) PCT No.: PCT/FR2004/000859

§ 371 (c)(1),
(2), (4) Date: Dec. 19, 2005

(87) PCT Pub. No.: WO2004/092682

PCT Pub. Date: Oct. 28, 2004

(65) Prior Publication Data

US 2006/0206285 A1    Sep. 14, 2006

(30) Foreign Application Priority Data

Apr. 7, 2003 (FR) .................................. 03 04275

(51) Int. Cl.
*H04Q 7/20* (2006.01)
(52) U.S. Cl. ............ 455/456; 324/207.21; 324/207.25; 324/207.23; 324/207.2; 324/232; 323/352; 702/150

(58) Field of Classification Search ................ 455/456; 324/207.21; 323/352; 202/180
See application file for complete search history.

(56) References Cited

U.S. PATENT DOCUMENTS

| 3,648,155 | A |   | 3/1972 | Soehner et al. |
| 5,331,278 | A | * | 7/1994 | Evanson et al. ............ 324/232 |
| 5,600,238 | A |   | 2/1997 | Holloway et al. |
| 6,448,762 | B1 | * | 9/2002 | Kono et al. ............... 324/207.2 |
| 6,466,011 | B1 | * | 10/2002 | Imanaka et al. ........ 324/207.23 |
| 2002/0135360 | A1 | * | 9/2002 | Matsukawa et al. ... 324/207.25 |

FOREIGN PATENT DOCUMENTS

EP                584426          2/1994

* cited by examiner

*Primary Examiner*—Joseph Feild
*Assistant Examiner*—David Q. Nguyen
(74) *Attorney, Agent, or Firm*—Dennison, Schultz & MacDonald

(57) ABSTRACT

A magnetic sensor for determining the position of a cellular phone in linear movement along an axis of translation, the sensor including a measuring cell fitted to a magnetic circuit and capable of measuring the variations in the value of the magnetic induction flux consecutive with the reluctance variations of the magnetic circuit. According to the invention, the sensor further includes a single delimiting fixed magnetic circuit between two fixed pole parts, a variable air gap within which at least a magnetic induction is created that extends along a length parallel to the axis of translation and at least equal to the travel to be measured of the cellular phone, and a measurable air gap to which the measuring cell is fitted.

11 Claims, 2 Drawing Sheets

CONTACTLESS MAGNETIC SENSOR FOR DETERMINATION OF THE LINEAR POSITION OF A MOVING BODY

The invention relates to the technical field of non-contact magnetic sensors capable of detecting the position of a cellular phone in linear movement along an axis of translation.

The purpose of the invention has an especially advantageous application, but not exclusive, within the field of motor vehicles with the intend of fitting different elements of linear movement whose position must be known and being part of, for example, an automatic gearbox, a member of suspension, an electronic clutch, a power assisted steering system, a vehicle height adjustment system, etc.

In the state of the technique, there are numerous types of sensors capable of recognising the linear position of a cellular phone in translation movement. For example, the French application 2 790 551 discloses a magnetic sensor for measuring the position of a cellular phone in linear movement along an axis of translation. This sensor comprises one or more generally two magnetic circuits in which a magnetic induction is created extending along a direction perpendicular to the axis of translation.

This or these magnetic circuits comprise, on one hand, a fixed pole part and, on the other hand, a triangle-shaped movable pole part delimiting an air gap of set width tilted in relation to the axis of translation and whose position in relation to the fixed pole part is representative of the position of the cellular phone. This movable pole part is part of a guided platform on runners and linked to the cellular phone whose position is to be measured. Such a sensor also comprises a measuring sensor fitted to the magnetic circuit, sensitive to the value of the magnetic induction flux and capable of measuring the variations in the value of the magnetic induction flux consecutive with the reluctance variations of the magnetic circuit allowing to determine the linear position of the cellular phone along the axis of translation.

A major inconvenience of this sensor is that it requires a connection between the movable part of the sensor and the cellular phone whose position is to be measured. Moreover, the linearity of such a sensor directly depends, on one hand, on the width of the air gap and, on the other hand, on the shape of the movable platform. Yet, in practice, it proves to be very difficult to create such an air gap with a constant width so that such a sensor can not produce a linear output signal. Thus, such a sensor appears to be very sensitive to the positioning of the movable platform in relation to the measuring cell. Finally, in order to present good precision, such a sensor must have two differential magnetic circuits each associated to a measuring cell and to sophisticated electronic handling circuits.

The purpose of the invention therefore aims at resolving the aforementioned inconveniences by proposing a non-contact magnetic sensor capable of determining the linear positions of a cellular phone in translation movement, without the need for major modification to the cellular phone nor any connections with said cellular phone.

Another purpose of the invention aims at proposing a position sensor of straightforward design, economic and employable to numerous types of cellular phone.

Another purpose of the invention is to propose a position sensor capable of providing a linear output signal according to the translation movement of the cellular phone.

In order to attain these purposes, the magnetic sensor according to the invention comprises a fixed magnetic circuit delimiting:
  a magnetic circuit within which at least a magnetic induction is created along a direction perpendicular to the axis;
  a measuring cell fitted to a magnetic circuit, sensitive to the value of the magnetic induction flux and capable of measuring the variations in the value of the magnetic induction flux consecutive with the reluctance variations of the magnetic circuit in order to determine the linear position of the cellular phone along the axis of translation;

According to the invention, the sensor comprises a single delimiting fixed magnetic circuit between two fixed pole parts:
  a variable air gap within which at least a magnetic induction is created that extends along a length parallel to the axis of translation and at least equal to the travel to be measured of the cellular phone, the variable air gap being capable of allowing the linear movement of the cellular phone which is equipped with means for modifying the reluctance of said variable air gap, mechanically independent of said sensor;
  and a measurable air gap to which the measuring cell is fitted.

According to a feature of embodiment allowing operation around magnetic zero, the magnetic circuit delimits a variable air gap within which a first magnetic induction is created that extends along a given length parallel to the axis of translation and along a direction perpendicular to the axis and a second magnetic induction extending along the side of the first induction, along a given length parallel to the axis of translation and along an opposite direction to the first induction, the sum of the lengths being at least equal to the travel to be measured of the cellular phone.

Advantageously, at least one and preferably the two pole pieces are equipped with a magnet creating the magnetic induction along a direction perpendicular to the axis.

According to an alternative embodiment, the variable air gap allows to displace the cellular phone whose means for modifying the reluctance are constituted by the terminal part of the cellular phone delimited by its free end.

According to another alternative embodiment, the variable air gap allows to displace the cellular phone whose means for modifying the reluctance are constituted by the parts of the cellular phone that have sections of different values.

Preferably, the variable air gap allows to displace the cellular phone whose means for modifying the reluctance are constituted by the parts that each have a revolution section.

Advantageously, the variable air gap allows to displace the cellular phone whose means for modifying the reluctance are formed by the zones with section of constant value in order to obtain a linear response from the sensor.

Advantageously, the variable air gap allows to displace the cellular phone of which one part of the cellular phone is positioned so as to extend at mid-travel, symmetrically in relation to the tie line between the two magnetic induction zones of opposite direction.

Advantageously, the variable air gap allows to displace the cellular phone of which one part of the cellular phone is arrange so that the surface of the junction between said parts of the cellular phone always extend within the induction zone whilst the cellular phone is travelling.

Another purpose of the invention aims at proposing a device for determining the position of a cellular phone in linear movement along an axis of translation, characterised in that it comprises:
- a sensor according to the invention;
- and means for modifying the reluctance fitted to the cellular phone.

Various other features will emerge from the description below in reference to the annexed figures which show, by way of non-restrictive examples, presentations of embodiments of the purpose of the invention.

Figure 4:
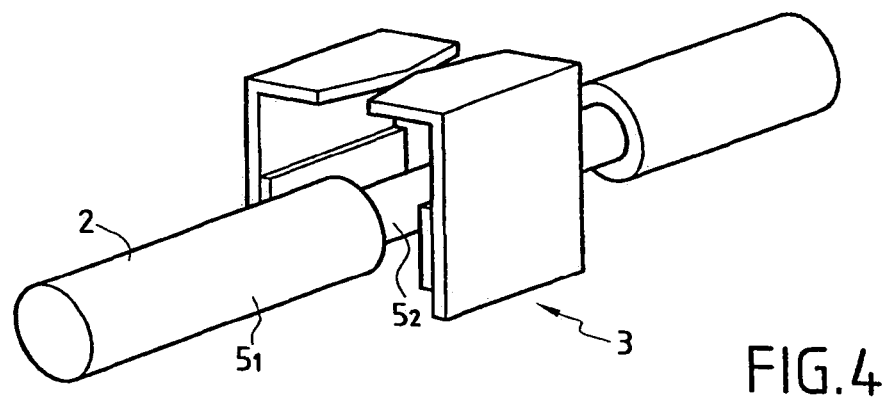

FIG. 4 diagrammatically illustrates another alternative embodiment of the sensor according to the invention.

Figure 5:
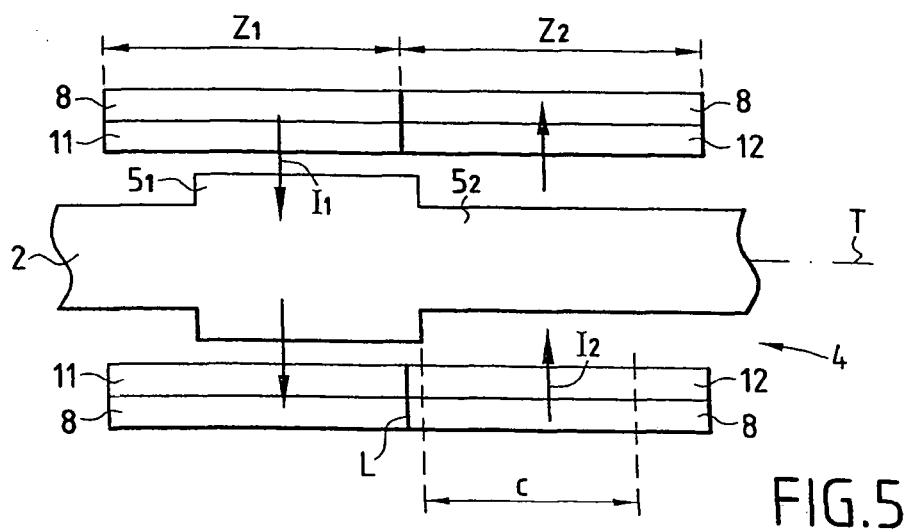

FIG. 5 is a cross section view illustrating another alternative embodiment of the sensor according to the invention.

Figure 1:
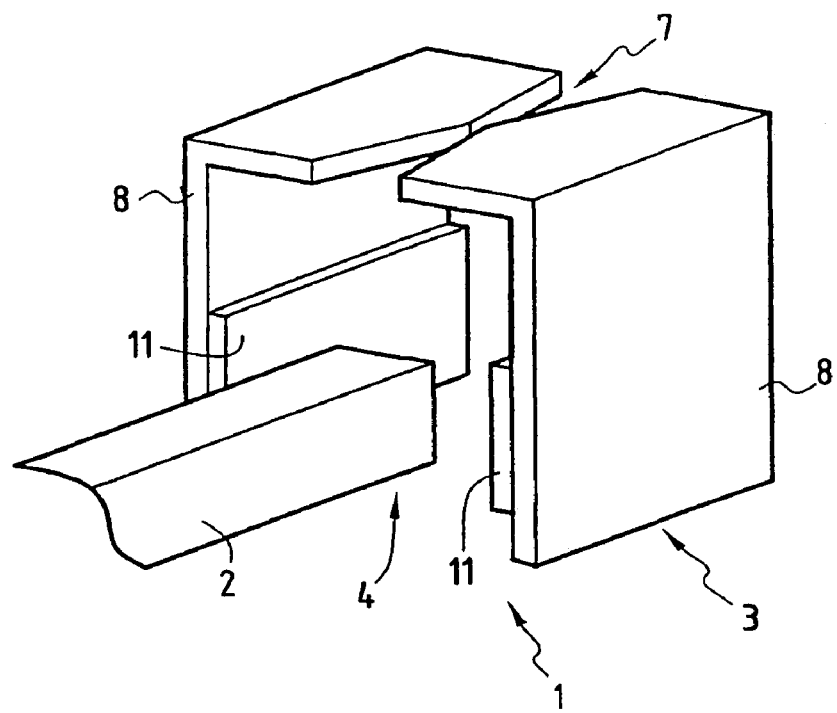
FIG. 1 is a perspective diagrammatic view illustrating a first embodiment of the sensor according to the invention.
Figure 2:
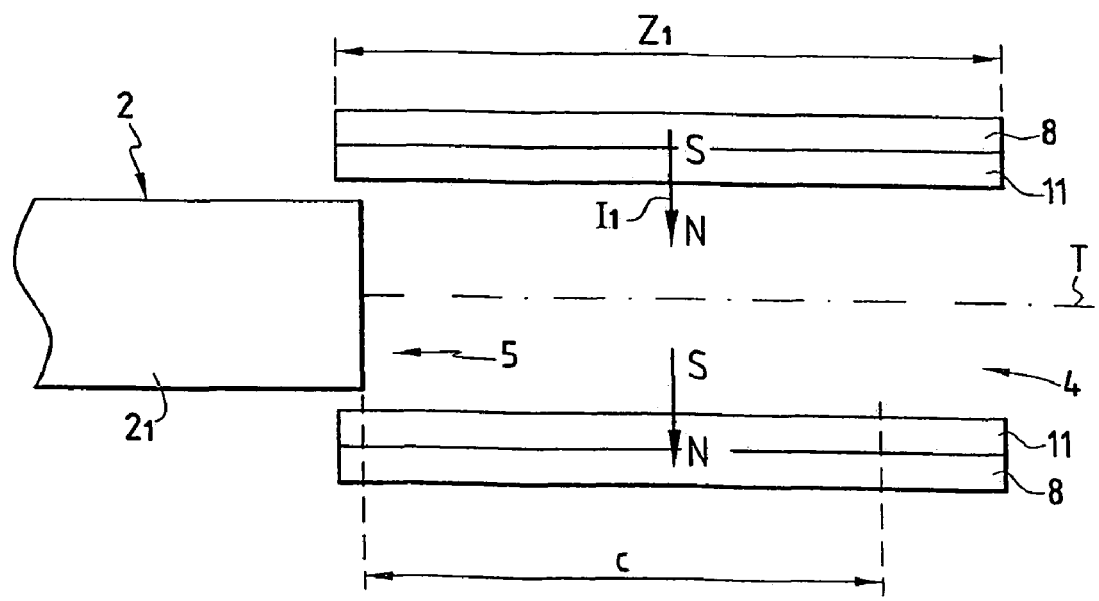
FIG. 2 is a cross section diagrammatic view of the sensor illustrated in FIG. 1.

As demonstrated more precisely in FIGS. 1 and 2, the purpose of the invention relates to a magnetic sensor 1 capable of determining the position of, globally, a cellular phone 2 in linear movement along an axis of translation T. The cellular phone 2 is constituted of any type of element with a linear travel that is preferably but not exclusively part of a device for motor vehicles.

According to the invention, the magnetic sensor 1 comprises a single fixed magnetic circuit 3 delimiting an air gap 4 in which at least one magnetic induction is created, represented by the arrows $I_1$ in the embodiment in FIGS. 1 and 2. The magnetic induction $I_1$ is directed along a direction perpendicular to the axis of translation T and extends along a given length or a zone $Z_1$ parallel to the axis of translation T. The extension zone $Z_1$ of the magnetic induction along the axis of translation T is at least equal to and, preferably, greater than the working travel C to be measured of the cellular phone 2.

The cellular phone 2 has means 5 allowing to modify the reluctance of the variable air gap 4 depending on the position of the cellular phone 2 along the axis of translation T. In other words, the cellular phone 2 is assembled in relation to the variable air gap 4 so that the reluctance of the variable air gap varies according to the position of the cellular phone along the axis of translation T. According to a feature of the invention, the means for modifying the reluctance 5 are mechanically independent from the sensor, that meaning not connected to the sensor. The means for modifying the reluctance 5 fitted to the cellular phone 2 create in association with the sensor 1 a complete device for determining the position of the cellular phone in linear movement along the axis of translation T.

The fixed magnetic circuit 3 also delimits a measuring air gap 7 in which a measuring sensor is intended to be fitted which is sensitive to the value of the magnetic induction flux. The measuring air gap 7 is arranged so that the cellular phone can measure the entire magnetic induction flux $I_1$ circulating in the magnetic circuit. Such a measuring cell, as for example a Hall-effect cell, is capable of measuring the variations in the value of the magnetic induction flux circulating in the magnetic circuit 3. These variations in the value of the magnetic induction flux are consecutive with the reluctance variations of the variable air gap 4 which are connected to the penetration value of the cellular phone 2 on the inside of the extension zone $Z_1$ thus allowing to determine the linear position of the cellular phone 2 along the axis of translation T.

In the illustrated embodiment, the magnetic circuit 3 is constituted of two fixed pole parts 8 fitted to define the variable air gap 4 and the measurable air gap 7 between them. These two pole parts 8 are made for example in a soft magnetic material. The pole parts 8 are assembled so as to delimit the variable air gap 4 which is capable of allowing the cellular phone 2 to move. In the illustrated embodiment, the fixed magnetic circuit 3 has a substantially rectangular section of which one side corresponds to the variable air gap 4 whereas the opposite side is equipped with the measuring air gap 7. According to this example, each pole part 8 is substantially L-shaped, extending symmetrically to each other in relation to a plane of symmetry passing through the axis of translation T. The two pole parts 8 are set apart at a distance suitable to allow the cellular phone 2 to move on the inside of the variable air gap 4 without the need for a connection between the cellular phone 2 and the sensor.

At least one and preferably two pole parts 8 are fitted with a magnet 11 creating, in the variable air gap 4, the magnetic induction $I_1$ along the direction perpendicular to the axis of translation T and over the extension zone $Z_1$. In the case where each pole part 8 is fitted with a magnet 11, the two magnets 11 are inversely assembled on the pole parts 8 according to the North/South poles so as to create the magnetic induction $I_1$ in the variable air gap 4 and generate its re-looping between the two pole parts 8.

As explained above, the cellular phone 2 is fitted with means 5 allowing to modify the reluctance of the variable air gap 4 depending on the position of the cellular phone 2 along the axis of translation T. for this reason, at least a part of the cellular phone 2 intended to extend in relation to the variable air gap 4 is made in soft magnetic material. Moreover, the part of the cellular phone 2 intended to extend into the variable air gap 4 has at least two sections with different values so that the reluctance of the variable air gap 4 can be modified depending on the extent of penetration of the cellular phone 2 into said variable air gap 4. In the example illustrated in FIGS. 1 and 2, the means for modifying 5 are constituted of the terminal part $2_1$ of the cellular phone 2 which comprises a section of constant value continued beyond its free end, a section of zero value. Thus, further the terminal part $2_1$ of the cellular phone penetrates into the variable air gap 4, greater the reduction in the reluctance of the variable air gap 4. In other words, the free end of the terminal part $2_1$ must be located in the zone $Z_1$ to allow for position detection.

Thus, the variable position of the cellular phone 2 in the variable air gap 4 generates a modification in the reluctance within this air gap generating a modification of the magnetic induction flux in the variable air gap, and consequently in the measuring air gap 7. It is to be noted that the cell measures the overall variation in the reluctance of the variable air gap 4, that meaning a reluctance known as disturbed corresponding to the foremost part of the cellular phone 2 inside the variable air gap, added to a reluctance know as non-disturbed corresponding to the rest of the variable air gap in which the cellular phone 2 is absent. This results in that the measure taken by the cell at the measuring air gap 7 is therefore dependent on the position of the cellular phone 2 along the axis T thus allowing to determine the position of the cellular phone 2 along the axis of translation T. The measuring cell thus produces an electric signal of which one characteristic (voltage, current, duty factor . . . ) varies in a linear manner depending on the position of the cellular phone 2 along the axis of translation T.

Figure 3:
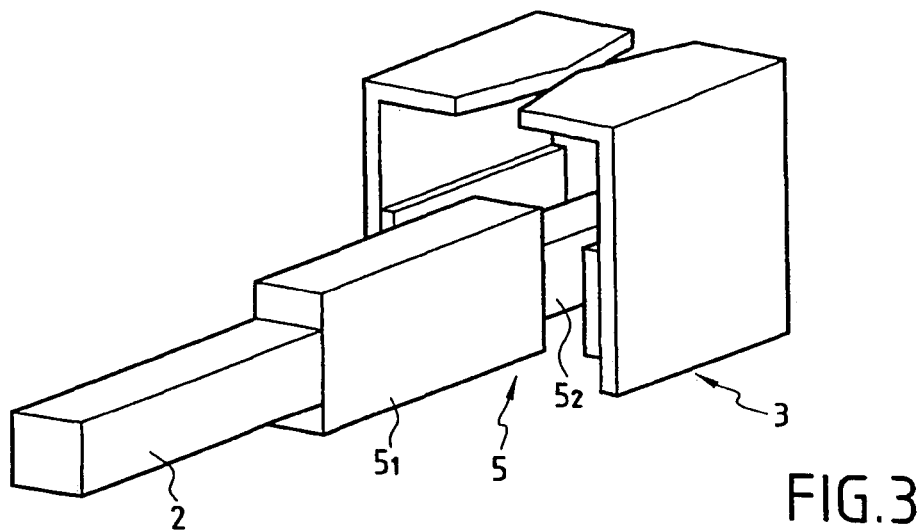
FIG. 3 is a perspective diagrammatic view showing another alternative embodiment of the sensor according to the invention.

In the example illustrated in FIGS. 1 and 2, the means for modifying 5 are constituted by the free end of the cellular phone 2 in linear movement inside the variable air gap 4. It is to be noted that the means for modifying 5 can be made in different ways. For example, the means for modifying 5 can be constituted of two different parts with sections of non-zero value. In the example illustrated in FIG. 3, the means for modifying 5 comprise a modifiable part $5_1$ different in relation to an adjacent part $5_2$. In the example illustrated in FIG. 3, the modifiable part $5_1$ is constituted of a pattern with a bigger section compared to its neighbouring part $5_2$ of reduce value. Of course, we can envisage the modifiable part $5_1$ as having a section of lower value than that of the adjacent part $5_2$.

In the above description of the two embodiments, the means for modifying 5 are made from zones or parts of the cellular phone 2 which each have a section of constant value (terminal part $2_1$, modifiable part $5_1$ and neighbouring part $5_2$). The implementing of a cellular phone 2 bearing zones with sections of constant value separated by a straight surface allows the sensor to produce a linear output signal. Indeed, the section or the shape of the parts of the cellular phone intended to extend inside the variable air gap 4 influence the response linearity of the sensor. It is also possible to obtain a non-linear response from the sensor, in varying the shape of the cellular phone 2, by making, for example, a part with progressive section. In other words, the means for modifying the reluctance 5 are, in this case, formed by at least one zone with sections of non-constant value in order to obtain a non-linear response from the sensor.

Likewise, according to a type of embodiment, the cellular phone 2 and in particular its part equipped with the means for modifying 5 has a revolution shape around the axis of translation T as illustrated in FIG. 4. Such a geometry of revolution for the parts $5_1$, $5_2$ allows the sensor to be hardly sensitive to the position of the cellular phone 2 along the axes perpendicular to the axis of translation T whilst providing the advantage of being sensitive to the angular position of the cellular phone about this axis. It is therefore possible to measure the translation position along its axis T for a rotating cellular phone.

According to an alternative embodiment illustrated in FIG. 5, the magnetic sensor 1 according to the invention allows operation around magnetic zero. According to this alternative embodiment, the magnetic circuit 3 has a variable air gap 4 within which a second magnetic induction $I_2$ is created that extends along the side of the first induction $I_1$ along a given length $Z_2$ parallel to the axis of translation T and along an opposite direction to the first induction $I_1$. Preferably, this second magnetic induction $I_2$ is created by one and preferably two magnets 12 each placed on a pole part 8 alongside the magnets 11 creating the first magnetic induction $I_1$. According to this alternative embodiment, the cellular phone 2 is positioned so as to extend at mid-travel, symmetrically in relation to the tie line L between the two zones $Z_1$, $Z_2$ of magnetic induction $I_1$, $I_2$ in opposite directions. In other words, the cellular phone 2 is position so that the middle of the modifiable part $5_1$ is in line with the tie line L when the cellular phone 2 is halfway along its travel C.

According to a preferred feature of embodiment, the parts of the cellular phone 2 are arranged so that the surface of the junction between the parts $5_1$, $5_2$ of the cellular phone always extend within a zone $Z_1$, $Z_2$ whilst the cellular phone 2 is travelling. Such a device allows to overcome the edge effects likely to appear if the end of a part of the cellular phone comes close to an end of the zones $Z_1$, $Z_2$.

As made clear by the above description, the sensor according to the invention has the advantage of being able to determine the position of a cellular phone without the need for a connection to the sensor and for modifications to the cellular phone in the form of an axis, for example. Due to its design, such a sensor is insensitive to erroneous positioning of the cellular phone along lateral and vertical directions, that meaning along the directions perpendicular to the axis of translation.

The invention claimed is:

1. Magnetic sensor to determine the position of a cellular phone (2) in linear movement along an axis of translation (T), the sensor comprising:
   a magnetic circuit within which at least a magnetic induction ($I_1$, $I_2$) is created along a direction perpendicular to the axis;
   a measuring cell fitted to a magnetic circuit, sensitive to the value of the magnetic induction flux and capable of measuring the variations in the value of the magnetic induction flux consecutive with the reluctance variations of the magnetic circuit in order to determine the linear position of the cellular phone (2) along the axis of translation (T); and
   a single delimiting fixed magnetic circuit between two fixed pole parts, comprising:
   a variable air gap (4) within which at least a magnetic induction ($I_1$, $I_2$) is created that extends along a length parallel to the axis of translation (T) and at least equal to the travel to be measured (C) of the cellular phone, the variable air gap (4) being capable of allowing the linear movement of the cellular phone (2) which is equipped with means (5) for modifying the reluctance of said variable air gap, mechanically independent of said sensor;
   and a measurable air gap (7) to which the measuring cell is fitted.

2. Magnetic sensor according to claim 1, wherein the magnetic circuit (3) delimits a variable air gap (4) within which a first magnetic induction ($I_1$) is created that extends along a given length ($Z_1$) parallel to the axis of translation (T) and along a direction perpendicular to the axis and a second magnetic induction ($I_2$) extending along the side of the first induction ($I_1$), along a given length ($Z_2$) parallel to the axis of translation and along an opposite direction to the first induction, the sum of the lengths ($Z_1$, $Z_2$) being at least equal to the travel to be measured (C) of the cellular phone.

3. Magnetic sensor according to claim 1, wherein the magnetic induction along a direction perpendicular to the axis is created by at least one pole piece (8) equipped with a magnet (11, 12).

4. Magnetic sensor according to claim 1, wherein the variable air gap (4) allows displacement of the cellular phone (2) having means for modifying the reluctance (5) comprising the parts ($5_1$, $5_2$) of the cellular phone that have sections of different values.

5. Magnetic sensor according to claim 4, wherein the variable air gap (4) allows displacement of the cellular phone (2) having means for modifying the reluctance (5) comprising the terminal part ($2_1$) of the cellular phone (2) delimited by its free end.

6. Magnetic sensor according to claim 4, wherein the variable air gap (4) allows displacement of the cellular phone (2) having means for modifying the reluctance (5) comprising the parts that each have a revolution section.

7. Magnetic sensor according to claim 4, wherein the variable air gap (4) allows displacement of the cellular phone (2) having means for modifying the reluctance (5)

formed by the zones ($2_1$, $5_1$, $5_2$) with sections of constant value in order to obtain a linear response from the sensor.

8. Magnetic sensor according to claim 4, wherein the variable air gap (4) allows displacement of the cellular phone (2) having means for modifying the reluctance (5) formed by at least one zone with sections of non-constant value in order to obtain a non-linear response from the sensor.

9. Magnetic sensor according to claim 5, wherein the variable air gap (4) allows displacement of the cellular phone (2) of which one part of the cellular phone (2) is positioned so as to extend at mid-travel, symmetrically in relation to the tie line (L) between the two zones ($Z_1$, $Z_2$) of magnetic induction in opposite directions.

10. Magnetic sensor according to claim 5, wherein the variable air gap (4) allows displacement of the cellular phone (2) of which one part of the cellular phone is arranged so that the surface of the junction between said parts ($5_1$, $5_2$) of the cellular phone always extend within the induction zone ($Z_1$, $Z_2$) whilst the cellular phone is traveling.

11. Device for determining the position of a cellular phone (2) in linear movement along an axis of translation (T), comprising:

a sensor comprising:
    a magnetic circuit within which at least a magnetic induction ($I_1$, $I_2$) is created along a direction perpendicular to the axis;
    a measuring cell fitted to a magnetic circuit, sensitive to the value of the magnetic induction flux and capable of measuring the variations in the value of the magnetic induction flux consecutive with the reluctance variations of the magnetic circuit in order to determine the linear position of the cellular phone (2) along the axis of translation (T); and a single delimiting fixed magnetic circuit between two fixed pole parts, comprising:

a variable air gap (4) within which at least a magnetic induction ($I_1$, $I_2$) is created that extends along a length parallel to the axis of translation (T) and at least equal to the travel to be measured (C) of the cellular phone, the variable air gap (4) being capable of allowing the linear movement of the cellular phone (2) which is equipped with means (5) for modifying the reluctance of said variable air gap, mechanically independent of said sensor;

and a measurable air gap (7) to which the measuring cell is fitted;

and means for modifying the reluctance (5) fitted to the cellular phone (2).

* * * * *